WILLIAM M. THOMPSON JR.
MARTIN KRON
DAVID S. SMITH
INVENTORS

BY R. Frank Smith
Steve W. Grembow
ATTORNEYS

July 12, 1960 W. M. THOMPSON, JR., ET AL 2,944,457
FILM PERFORATING MACHINE
Filed Nov. 22, 1957 6 Sheets-Sheet 4
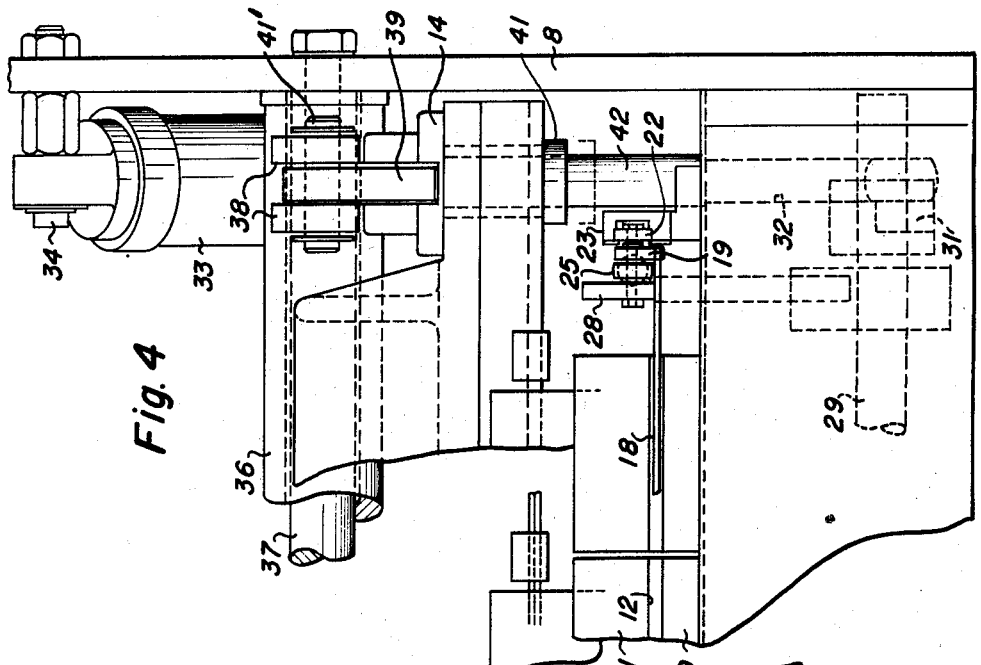
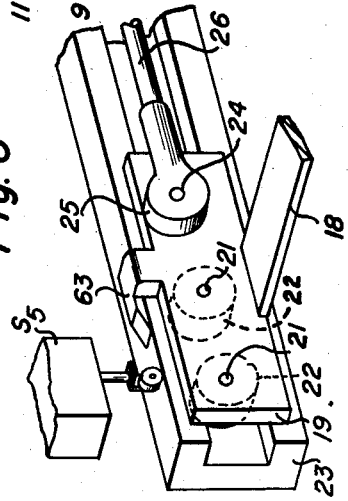
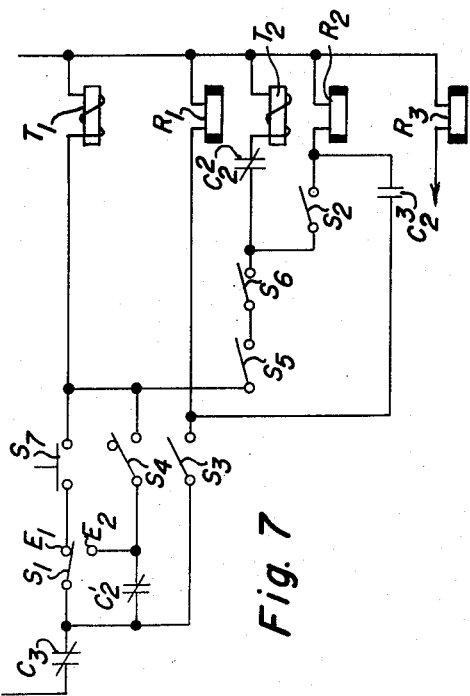
WILLIAM M. THOMPSON JR.
MARTIN KRON
DAVID S. SMITH
INVENTORS
BY R. Frank Smith
Steve W. Grembaw
ATTORNEYS

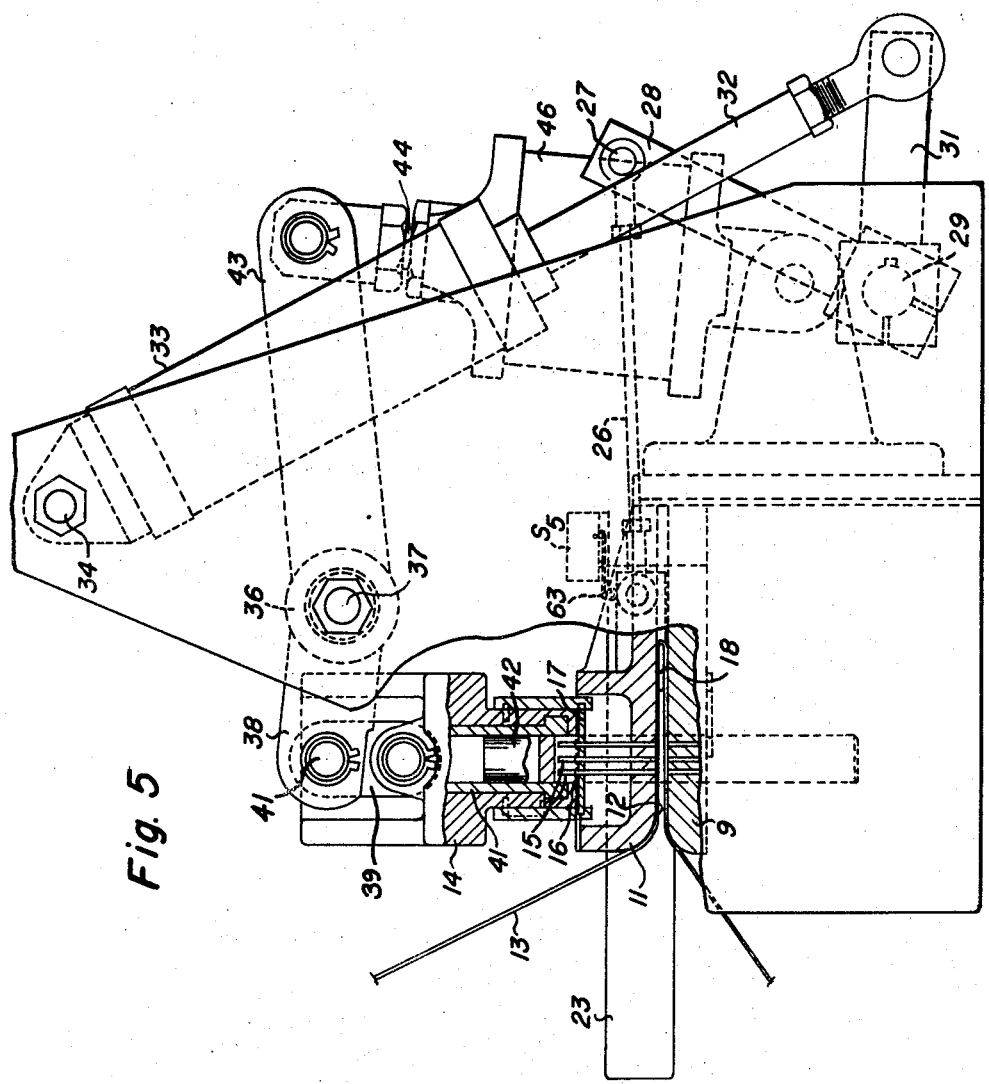

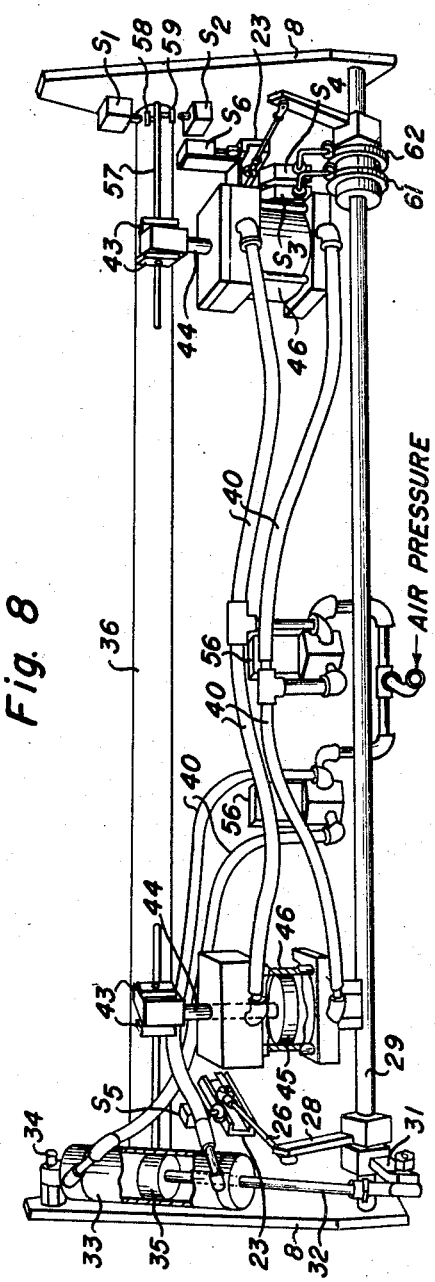

United States Patent Office 2,944,457
Patented July 12, 1960

2,944,457

FILM PERFORATING MACHINE

William M. Thompson, Jr., Martin Kron, and David S. Smith, Rochester, N.Y., assignors to Eastman Kodak Company, Rochester, N.Y., a corporation of New Jersey Filed Nov. 22, 1957, Ser. No. 698,233

10 Claims. (Cl. 83—221)

This invention relates generally to perforating mechanisms, and more specifically to a film perforating machine adapted to punch out a series of identifying numbers across a web of photographic film so that the individual narrow strips of film that are slit from the parent web can later be identified as having come from that particular web.

Several methods have been used heretofore to identify the individual strips of film that are slit from the parent web. One of such methods incorporates an adhesive strip or decalcomania extending across the width of the film and having numbers thereon to identify the individual strips slit from the parent web. This method is not entirely successful in that the adhesive bond existing between the decalcomania and the web is not permanent enough, often drying up or losing its adhesive strength causing the decalcomania to fall off of the web. A simpler system for identifying the individual strips of film slit from the parent web utilizes the application to the individual strips of identifying marks made by a grease pencil. This system is disadvantageous in that it necessitates the services of an operator to apply the grease marks, and is further objectionable in that the marks are often illegible since the operator has to work in almost total darkness. Another mechanism for identifying the individual strips of film slit from the parent web comprises a roller having a plurality of axially spaced numbers on its periphery adapted to apply identifying ink marks across the width of the film. This mechanism is not too satisfactory, primarily because the ink numbers are not permanent enough, often rubbing off of the film, and the ink is often applied too heavily causing the ink to run over the film resulting in film spoilage. Furthermore, the problem exists of selecting an ink that is compatible with the film.

Therefore, one of the objects of the present invention is to provide an improved film perforator mechanism adapted to punch out a series of identifying numbers across the width of a web of photographic film that eliminates all the disadvantages of prior known methods or mechanisms.

Another object of this invention is the provision of a film perforator mechanism for punching out a series of identifying numbers across the width of a web of photographic film that is simple in construction, thoroughly reliable and efficient in operation, and economical to manufacture.

Still another object of this invention is the provision of an improved film perforating mechanism of rugged construction adapted to withstand long continuous service with a minimum of maintenance and adjustment.

One more object of this invention is the provision of an improved film perforating mechanism in which the identifying numbers punched out of the film can be read from either side of the film.

A more specific object of this invention is the provision of an improved film perforating mechanism adapted to form a loop of film and to punch out identifying numbers through the loop.

Objects and advantages other than those set forth above will be apparent from the following description when read in connection with the accompanying drawings, in which:

Fig. 4 is a segmental elevation view of a portion of the film perforating mechanism of Fig. 3 looking at it from line 4—4;

Fig. 5 is a side elevation view of the structure of Fig. 4 with a portion thereof broken off and sectioned;

Fig. 6 is an enlarged perspective view of the channel and support members shown in Figs. 2 and 4.

Fig. 7 is a schematic diagram of the electrical circuit of the film perforating mechanism; and Fig. 8 is a reduced rear elevation view in perspective of the structure of Fig. 5.

Figure 3:
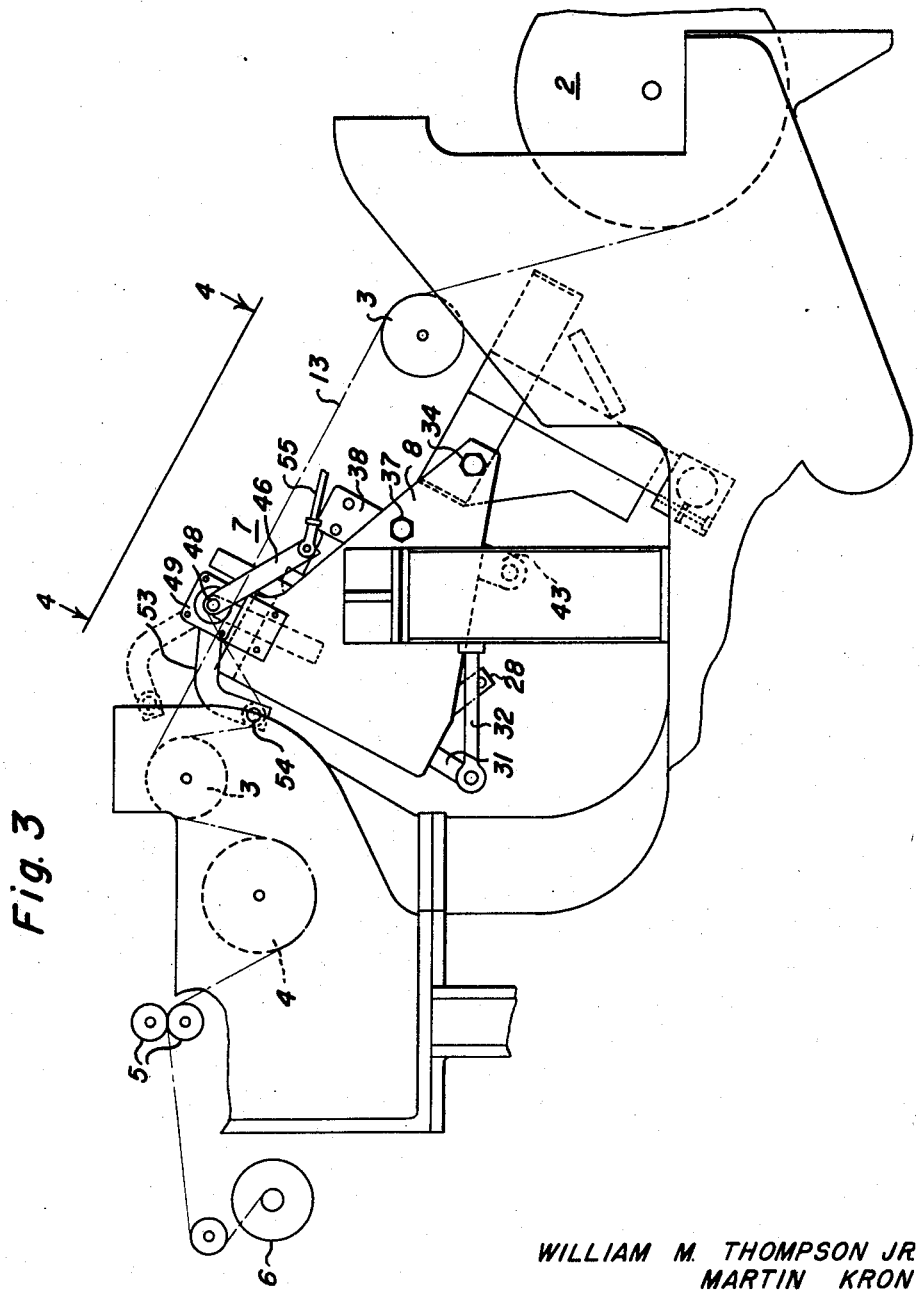
Fig. 3 is a segmental side elevation view of the film perforating mechanism and slitting machine.

As shown in the drawings, particularly Fig. 3, a preferred embodiment of this invention is illustrated as applied to a slitting machine 1 of known type having a supply roll 2, idler rollers 3, a metering drum 4, a plurality of slitter knives 5, and a take-up roll 6.

The film perforating mechanism shown generally at 7 is provided with spaced apart frame members 8 secured to the slitting machine by any suitable means, not shown. The film perforating mechanism 7 further comprises a film perforator of known type as shown in Fig. 5 having a die-plate 9, a punch holder 11 spaced apart from the die-plate to form a passageway 12 into which a film 13 is drawn, and a reciprocally movable pressure plate 14 adapted to engage punches 15 and urge them through the film. The punches 15 are provided with shoulders 16, and a stripper plate 17 secured or carried by the pressure plate 14 is adapted to engage the shoulders 16 of the punches 15 to withdraw them from the film 13. This perforator structure is a commercial item and the operation thereof is essentially as shown and described in U.S. Patent 2,330,997.

The mechanism for drawing the film 13 into the passageway 12 comprises a tuck bar 18 secured at each end to the underside of a rectangular support member 19 as best seen in Fig. 6. Each of the support members 19 has a pair of spaced-apart studs 21 for supporting rollers 22 adapted to ride in a generally U-shaped channel member 23 carried by the mechanism 7. The support members 19 are further provided with a stud 24 for receiving an eye-bolt 25 secured to one end of a rod 26, the opposite end of the rod 26 being mounted on a stud 27 carried by an arm 28 as seen in Fig. 5. The opposite end of the arm 28 is keyed to a cylindrical rod 29 mounted for rotation within bearings carried by the frame members 8. A crank 31 is secured to the cylindrical rod adjacent one of the arms 28 as seen in Figs. 5 and 8, and the opposite end of the crank 31 is secured by a bolt to one end of a piston rod 32 of a double-acting air cylinder 33 of a well known commercial type. The opposite end of the air cylinder 33 is pivotally movable on a bolt 34 carried by the upper end of the frame member 8. It is readily apparent that movement of a piston 35 which is secured to the piston rod 32 in one direction or the other is transmitted through the crank 31, arm 28, and rod 26 to the support member 19 which is reciprocally movable within the channel members 23.

The mechanism for imparting reciprocal movement to the pressure plate 14 of the perforator comprises an elongated cylindrical member 36 pivotally mounted on a shaft 37 rigidly secured at each end to one of the frame members 8 as best seen in Fig. 5. The cylindrical member 36 is provided on one side with a pair of arms having bifurcated ends 38 as seen in Fig. 4, only one of which is shown, for receiving one end of a link member 39. A bolt 41 is inserted through openings formed by the bifurcated end 38 and link member 39 to pivotally secure the two together. The opposite end of the link 39 is pivotally secured to the pressure plate 14 which is reciprocally movable by virtue of bushings 41 carried by the plate slidably disposed on complementary guide rods 42, only one of which is shown. The opposite side of the cylindrical member 36 is also provided with a pair of arms having bifurcated ends 43 as seen in Fig. 8 for receiving one end of a piston rod 44 which is pivotally secured thereto. The opposite end of the rod 44 is secured to a piston 45 of a double-acting air cylinder 46 of a known commercial type. It is again apparent that reciprocal movement of the piston 45 and piston rod 44 will impart a reciprocal movement to the pressure plate 14 by virtue of the cylindrical member 36, arms 38, and link member 39, causing the punches 15 to be urged downwardly and upwardly.

Figure 1:
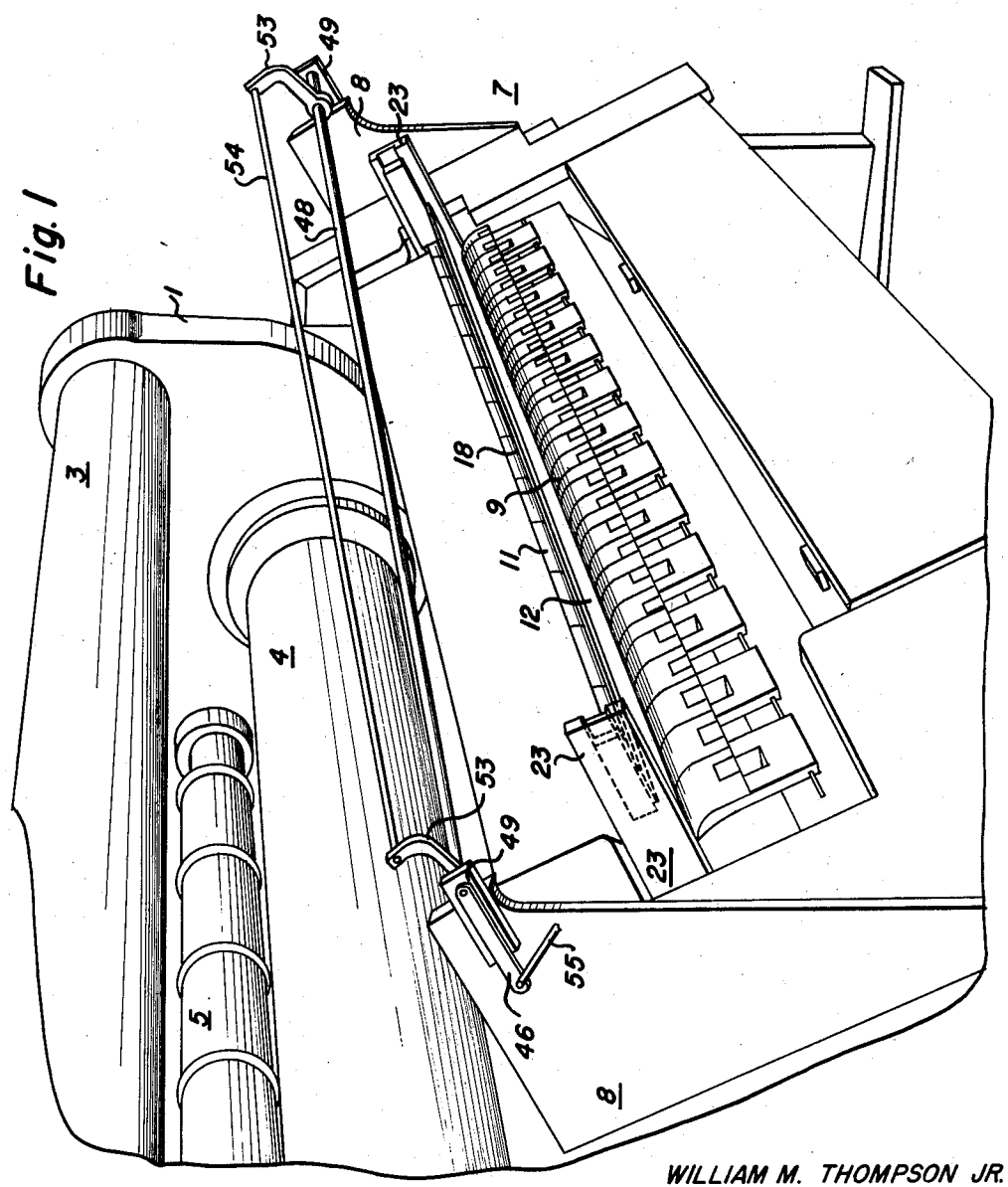
Fig. 1 is a segmental view in perspective showing the film perforating mechanism of this invention mounted on a slitting machine.

A mechanism for providing slack in the film web 13 to permit the tuck bar 18 to draw a loop of film into the passageway 12 of the perforating mechanism without damaging the film is shown in Figs. 1 and 3. The mechanism comprises a crank 46 mounted on a shaft 48 carried by flanges 49 secured to the frame members 8. Arms 53 are mounted on the shaft 48 and the free ends of the arms 53 carry a rotatable cylindrical rod 54. Pivotal movement of the crank 46 by a lever 55 causes pivotal movement of the arms 53 bringing the rod 54 into engagement with the film.

The air cylinders 33, 46 are operated by a suitable source of air pressure, and are further provided with solenoid operated air valves 56 of any known commerical type as seen in Fig. 8 for controlling the admittance of air pressure to one or the other side of the pistons 35, 45 through suitable air hoses 40 for reciprocally moving the pistons.

The automatic operation of the perforating mechanism 7 is accomplished electrically as shown schematically in Fig. 7. A plurality of microswitches are actuated by various components of the mechanism. The cylindrical member 36 as seen in Fig. 8 has a rib 57 formed on one side thereof provided with adjusting screws 58, 59 adapted to engage and actuate a microswitch $S_1$ at one end of its travel and a microswitch $S_2$ at the opposite end of its travel. The cylindrical rod 29 is provided with a pair of cams 61, 62 adapted to actuate microswitches $S_3$ and $S_4$ respectively for a purpose to be explained hereinafter. A pair of microswitches $S_5$ and $S_6$ are carried by the mechanism 7 adjacent one end of the channel members 23 and are actuable by lugs 63 as seen in Fig. 6 formed by the support members 19 as the support members arrive at one end of their travel. Electrical relay $R_1$ controls an electrical contact $C_1$, not shown, carried by the slitting machine, relay $R_2$ controls contacts $C_2^1$, $C_2^2$, and $C_2^3$ and relay $R_3$ controls the electrical contact designated $C_3$. The mechanism is further provided with a solenoid $T_1$ adapted to actuate one of the air valves 56 to admit air pressure to the cylinder 33 causing the piston 35 to move which in turn moves the tuck bar 18 inwardly or outwardly depending upon the direction of movement of the piston 35. A similar solenoid $T_2$ is provided for actuating the other air valve 56 admitting air pressure to cylinders 46 causing the pistons 45 to move which in turn moves the pressure plate 14 downwardly to push the punches 15 through the loop of film 13 or upwardly withdrawing the punches 15 depending upon the direction of movement of the pistons 45.

Figure 2:
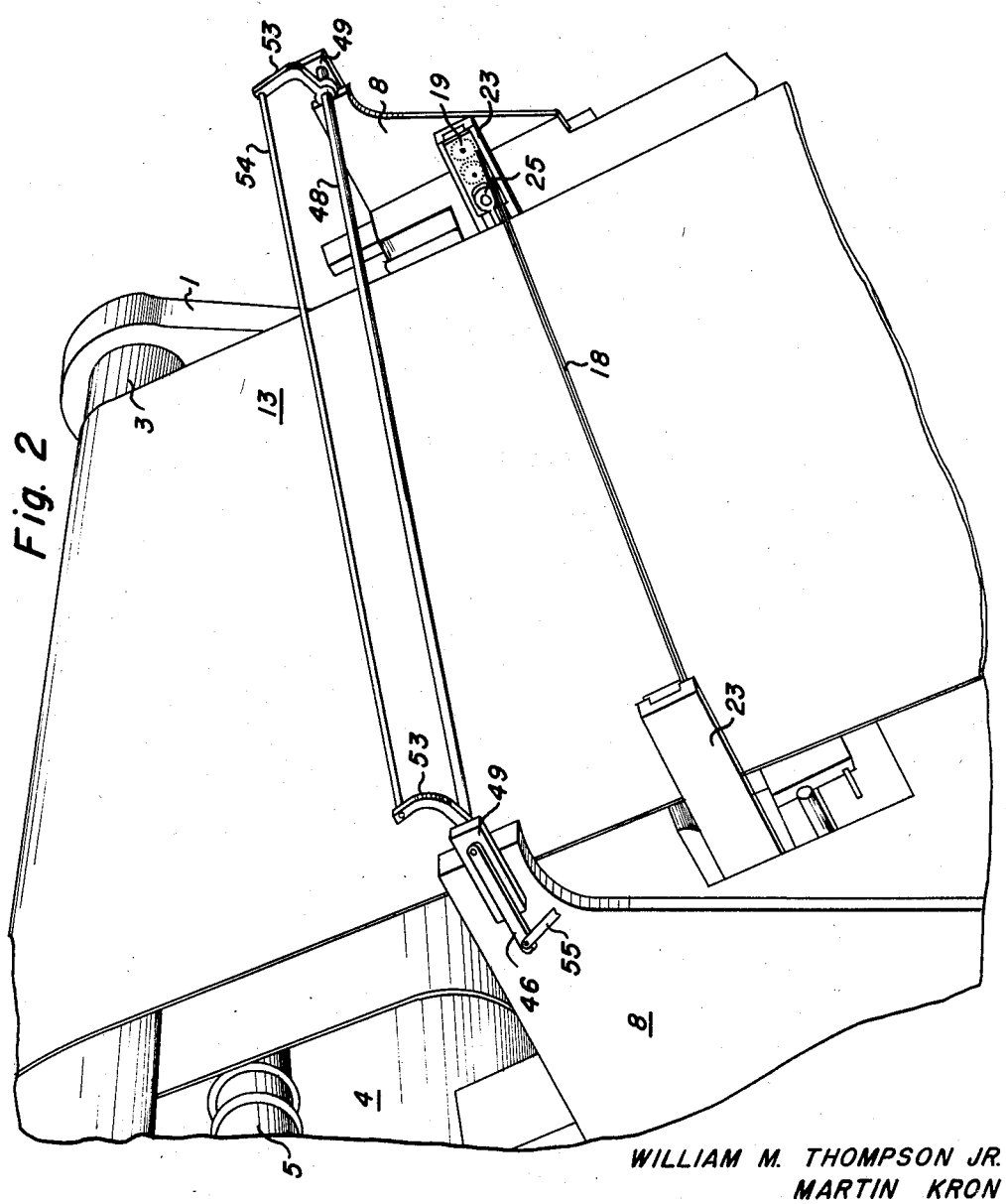
Fig. 2 is a view similar to Fig. 1 showing the position of the film with respect to the perforator mechanism.

To describe the film perforating mechanism 7 of this invention, let us assume initially that the film perforating mechanism is inoperative, as shown in Fig. 2. In this position, the slitting machine 1 is operating and the film web 13 is interposed between the tuck bar 18 and perforating mechanism 7 out of contact with any part of the perforating mechanism. This is necessary because contact of the moving film web 13 by any portion of the perforating mechanism 7 might mar or scratch or otherwise damage the film web. Now let us assume that the operator has slit a predetermined number of feet of film 13 and wishes to punch out identifying numbers or indicia across the entire width of the film web so that in later operations the individual strips may be identified with respect to the parent film web from which they originated. Two spaced apart start switches $S_7$ are provided on the machine, one of which is shown schematically in Fig. 7, requiring the operator to use both hands, one for each switch, to start the perforating mechanism 7. An interlock system is provided so that if the operator were to press the start buttons $S_7$ to start the perforating mechanism 7 while the slitting machine 1 is operating, the perforating mechanism will not start. Also, if the operator attempts to start the slitting machine 1 while the perforating mechanism is operating, the slitting machine will not start. When the slitting machine 1 is in operation, the relay $R_3$ is operative opening the contact $C_3$. Consequently, as long as the slitting machine 1 is in operation, the perforator mechanism cannot be operated. Also, when the perforating mechanism is operating, the relay $R_1$ actuates the contact $C_1$ of the slitting machine so that it cannot be started as long as the perforating mechanism is operating. Assuming the slitting machine 1 has been stopped and the contact $C_3$ closed, the operator initially pulls lever 55 pivotally moving crank 46 causing the arms 53 and rod 54 to pivotally move therewith with the rod 54 engaging the stopped film 13 and urging the film inwardly to provide a loop of film substantially free of tension on one side of the perforator mechanism 7 as seen in Fig. 3. The operator then grasps the film 13 from the supply roll 2 and pulls it to form another loop free of tension on the opposite side. Accordingly, sufficient slack in the film 13 is provided so that the tuck bar 18 can draw a loop of film into the passageway 12 of the perforator mechanism 7 easily and without damaging the film 13. The operator then presses the start buttons $S_7$ completing the electrical circuit to the tuck bar solenoid $T_1$ through the closed contact $C_3$ and closed punch switch $S_1$. The tuck bar solenoid $T_1$ actuates one of the air valves 56 admitting air pressure to the cylinder 33, causing the piston 35 to move downwardly as shown in Fig. 5 and causing the tuck bar 18 to be moved inwardly by virtue of the piston rod 32, crank 31, arm 28, rod 26 and support member 19. Initial movement of the cylindrical rod 29 and cam 61 causes switch $S_3$ to close. The closing of switch $S_3$ completes the circuit through relay coil $R_1$ which in turn actuates the electrical interlock contact $C_1$. When the tuck bar enters the passageway, the cam 62 closes switch $S_4$ completing an electrical circuit to the tuck bar solenoid $T_1$ through closed contacts $C_3$, $C_2^1$ and switch $S_4$ so that the start buttons $S_7$ may be released. This is a safety feature requiring the operator to keep the start buttons $S_7$ pressed until the tuck bar 18 enters the passageway 12 to eliminate the possibility of the operator getting his hands caught between the tuck bar 18 and the throat of the passageway 12. When the tuck bar 18 reaches the end of its travel inwardly, the lugs 63 of the support members 19 close the switches $S_5$ and $S_6$ completing the electrical circuit through contacts $C_3$, $C_2^1$ and switches $S_4$, $S_5$ and $S_6$ to a solenoid $T_2$. The solenoid $T_2$ actuates the other two-way valve 56 causing air pressure to be admitted to one side of the pistons 45 causing the pistons 45, piston rods 44, cylindrical member 36, arms 38, link 39 and pressure plate 14 to be urged in a direction causing the punches 15 to pass through the loop of film drawn into the passageway 12 by the tuck bar 18. After the initial movement of the cylindrical member 36, the switch $S_1$ is moved from its position in contact with element $E_1$, into contact with element $E_2$ thereby bypassing the normally closed contact $C_2^1$. When the pressure plate 14 has reached the bottom of its stroke, the cylindrical member 36 closes switch $S_2$ establishing an electrical circuit through contact $C_3$, switches $S_1$, $S_4$, $S_5$, $S_6$ and $S_2$ to the relay coil $R_2$. The relay coil $R_2$ when energized opens the contacts $C_2^1$ and $C_2^2$ which are normally closed, and closes the contact $C_2^3$ which is normally open. This electrically seals in the relay coil $R_2$ through contacts $C_3$, $S_3$ and $C_2^3$. Further, the opening of the normally closed contacts $C_2^1$ and $C_2^2$ breaks the electrical circuit to the solenoid $T_2$. The de-energization of the solenoid $T_2$ actuates air valve 56 causing the pressure plate 14 to move upwardly or in the opposite direction which at the beginning of its movement opens switch $S_2$. The relay coil $R_2$, however, stays energized because it is sealed in by the closed contact $C_2^3$ as mentioned heretofore. As the pressure plate 14 completes its movement, it moves switch $S_1$ into its original position in contact with element $E_1$. This breaks the electrical circuit through the solenoid $T_1$ which actuates the air valve 56 causing the piston 35 to move the tuck bar 18 outwardly to collapse the film loop. As the cylindrical rod 29 and cams 61, 62 are turned in moving the tuck bar 18 outwardly, the cam 62 actuates switch $S_4$ moving it to an open position, and as the tuck bar 18 reaches its rest position, the cam 61 engages switch $S_3$ opening it and breaking the electrical circuit to relay coil $R_1$ causing the contact $C_1$ to open. Also, the relay coil $R_2$ is de-energized closing the normally closed contacts $C_2^1$, and $C_2^2$ and opening the normally open contact $C_2^3$. At this time, the punches 15 are fully retracted, the tuck bar 18 fully withdrawn, and the perforating mechanism 7 in its original non-operating position.

Although but one embodiment has been illustrated and described, it will be apparent to those skilled in the art that various changes and modifications may be made therein without departing from the spirit of the invention or from the scope of the appended claims.

We claim:

1. In a perforating machine, the combination of: a punch holder; a plurality of punches slidably carried by said holder; a die plate spaced from said punch holder to form a passageway for receiving a material to be punched; means reciprocally movable within said passageway to draw said material therein in the form of a loop; and means for reciprocally operating said punches in timed relation to said first recited means whereby said punches pass through said loop of material.

2. The invention as defined in claim 1 wherein said first recited means comprises a bar.

3. The invention as defined in claim 1 wherein said first recited means comprises an elognated bar, a support member secured to each end of said bar, guide means for reciprocally receiving said support members, and means for imparting reciprocal movement to said bar and support members.

4. The invention as defined in claim 3 wherein said support member carries rollers, and said guide means comprise channel members for slidably receiving said rollers.

5. The invention as defined in claim 3 wherein said last recited means comprises a cylinder having a piston responsive to air pressure, and linkage means for connecting said piston to said support members whereby the reciprocal movement of said piston is imparted to said support members.

6. The invention as defined in claim 5 wherein said linkage means comprises a shaft, a crank mounted on said shaft and having one end connected to the piston rod, a pair of spaced apart arms mounted on said shaft, and a pair of rod members, each of said rod members connecting an end of one of said arms to one of said support members.

7. In a perforating machine, the combination of: a punch holder; a plurality of punches slidably carried by said holder; a die plate spaced from said punch holder to form a passageway of predetermined length for receiving a material to be punched; an elongated bar parallel to and in the same plane as said passageway and further having a length greater than said predetermined length; a support member secured to each end of said bar; roller means carried by said support members; a pair of channel members carried by said perforating machine, each of said channel members disposed adjacent one end of said passageway and transverse thereto and adapted to slidably receive one of said roller means; first means for imparting reciprocal movement to said bar and support members and adapted when said bar and support member are moved in one direction to draw said material within said passageway in the form of a loop; and second means for reciprocally operating said punches in timed relation to said bar whereby said punches pass through said loop of material.

8. The invention as defined in claim 7 wherein said first means comprises a cylinder having a piston responsive to air pressure, and linkage means for connecting said piston to said support members whereby the reciprocal movement of said piston is imparted to said support members.

9. The invention as defined in claim 8 wherein said linkage means comprises a shaft, a crank mounted on said shaft and having one end connected to the piston rod, a pair of spaced apart arms mounted on said shaft, and a pair of rod members, each of said rod members connecting an end of one of said arms to one of said support members.

10. The invention as defined in claim 7 wherein first switch means are electrically connected to said first means which when actuated cause said first means to move said bar in one direction into said passageway drawing a loop of material therein, second switch means actuated by said support members after said bar has completed its inward movement drawing the loop of material past the punches to cause said second means to move said punches in one direction through said passageway and loop of material, third switch means actuated by said second means after said punches have passed through said loop causing said second means to move said punches in said opposite direction out of said passageway, and fourth switch means actuated by said second means after said punches are withdrawn from said passageway to cause said first means to move in the opposite direction withdrawing said bar from said passageway.

References Cited in the file of this patent

UNITED STATES PATENTS

| | | |
|---|---|---|
| 2,363,971 | Katz | Nov. 28, 1944 |
| 2,690,910 | Tuck | Oct. 5, 1954 |